(12) United States Patent
Abu-Ali

(10) Patent No.: US 10,674,742 B2
(45) Date of Patent: Jun. 9, 2020

(54) SYSTEM AND METHOD FOR MAKING ICE CREAM

(71) Applicant: TANGENT FOODS INTERNATIONAL LIMITED, Grand Cayman (KY)

(72) Inventor: Jareer Mansour Abu-Ali, Phitsanulok (TH)

(73) Assignee: TANGENT FOODS INTERNATIONAL LIMITED, Grand Cayman (KY)

( * ) Notice: Subject to any disclaimer, the term of this patent is extended or adjusted under 35 U.S.C. 154(b) by 356 days.

(21) Appl. No.: 14/989,335

(22) Filed: Jan. 6, 2016

(65) Prior Publication Data

US 2016/0192675 A1    Jul. 7, 2016

Related U.S. Application Data

(60) Provisional application No. 62/100,126, filed on Jan. 6, 2015, provisional application No. 62/100,133, filed on Jan. 6, 2015.

(51) Int. Cl.
*A23G 9/12* (2006.01)
*A23G 9/22* (2006.01)

(52) U.S. Cl.
CPC ............................ *A23G 9/12* (2013.01); *A23G 9/22* (2013.01)

(58) Field of Classification Search
CPC .................. A23G 9/12; A23G 9/22
See application file for complete search history.

(56) References Cited

U.S. PATENT DOCUMENTS

| 1,814,167 A * | 7/1931 | Laird | A23G 9/12 62/163 |
| 1,844,745 A * | 2/1932 | Crosby | A23G 9/12 366/245 |
| 2,252,043 A * | 8/1941 | Sissel | A23G 9/06 366/144 |
| 2,557,813 A * | 6/1951 | Burton | A23G 9/106 366/149 |
| 2,896,421 A * | 7/1959 | Rader | A23G 9/045 62/135 |
| 2,993,350 A * | 7/1961 | Smith | A23G 9/106 366/228 |
| 3,061,279 A * | 10/1962 | Reed | A23G 9/045 187/256 |
| 3,295,997 A * | 1/1967 | Tomlinson | A23G 9/045 241/34 |
| 3,633,664 A * | 1/1972 | Walsh | A23G 9/12 165/94 |
| 3,828,572 A * | 8/1974 | Calim | A23G 9/22 251/304 |

(Continued)

FOREIGN PATENT DOCUMENTS

WO    WO-2014067987 A1 *   5/2014

*Primary Examiner* — Ljiljana V. Ciric
(74) *Attorney, Agent, or Firm* — Millen, White, Zelano & Branigan, P.C.; William Nixon

(57) ABSTRACT

A system for making ice cream includes a pod, a whisking component, and a freezing component. The pod includes a mixture having a powder mixture, a flavoring liquid, and a stabilized fluid. The whisking component is attached to the pod. The whisking component whisks the mixture and produces a whisked, aerated mixture. The freezing component freezes the whisked mixture and produces ice cream.

7 Claims, 15 Drawing Sheets

(56) References Cited

U.S. PATENT DOCUMENTS

| | | | | |
|---|---|---|---|---|
| 3,839,881 A * | 10/1974 | Calim | A23G 9/16 | 165/159 |
| 3,874,189 A * | 4/1975 | Calim | A23G 9/20 | 222/406 |
| 3,898,859 A * | 8/1975 | Duke | A23G 9/12 | 62/135 |
| 3,916,637 A * | 11/1975 | Marrie | A47J 43/04 | 62/136 |
| 3,921,961 A * | 11/1975 | Hapgood | A23G 9/12 | 366/149 |
| 3,952,534 A * | 4/1976 | Jacobs | A23G 9/12 | 62/136 |
| 3,977,656 A * | 8/1976 | Faivre | A23G 9/12 | 366/282 |
| 3,988,902 A * | 11/1976 | Jacobs | A23G 9/12 | 62/136 |
| 4,070,957 A * | 1/1978 | Korekawa | A23G 9/12 | 366/149 |
| 4,089,367 A * | 5/1978 | Wietzel | A23B 4/0053 | 165/101 |
| 4,092,835 A * | 6/1978 | Tanguy | A23G 9/12 | 366/206 |
| 4,450,692 A * | 5/1984 | Sharpe | A23G 9/228 | 62/233 |
| 4,545,216 A * | 10/1985 | Cavalli | A23G 9/12 | 62/343 |
| 4,664,529 A * | 5/1987 | Cavalli | A23G 9/12 | 366/144 |
| 4,696,166 A * | 9/1987 | Bukoschek | A23G 9/12 | 366/601 |
| 4,716,822 A * | 1/1988 | O'Brien | A23G 9/12 | 366/149 |
| 4,747,272 A * | 5/1988 | Howell | A23G 9/12 | 137/101.21 |
| 4,773,233 A * | 9/1988 | Kawasumi | A23G 9/12 | 62/340 |
| 4,796,440 A * | 1/1989 | Shiotani | A23G 9/12 | 222/227 |
| 4,993,238 A * | 2/1991 | Inagaki | A23G 9/04 | 366/102 |
| 5,098,732 A * | 3/1992 | Inagaki | A23G 9/10 | 426/312 |
| 5,363,660 A * | 11/1994 | Li | A23G 9/12 | 62/71 |
| 5,363,746 A * | 11/1994 | Gordon | A23G 9/12 | 366/145 |
| 5,385,645 A * | 1/1995 | Li | A23G 9/12 | 159/13.2 |
| 5,419,150 A * | 5/1995 | Kaiser | A23G 9/16 | 62/342 |
| 5,617,734 A * | 4/1997 | Chase | A23G 9/045 | 366/288 |
| 5,680,769 A * | 10/1997 | Katz | A23G 9/12 | 62/258 |
| 5,713,209 A * | 2/1998 | Hunchar | A23G 9/12 | 366/301 |
| 5,766,665 A * | 6/1998 | Miller | A23G 9/045 | 222/144.5 |
| 5,768,894 A * | 6/1998 | Li | A23G 9/12 | 62/71 |
| 6,068,875 A * | 5/2000 | Miller | A23G 9/045 | 222/144.5 |
| 6,119,472 A * | 9/2000 | Ross | A23G 9/16 | 62/228.2 |
| 6,370,892 B1 * | 4/2002 | Ross | A23G 9/08 | 62/136 |
| 6,438,987 B1 * | 8/2002 | Pahl | A23G 9/045 | 62/342 |
| 6,446,547 B2 * | 9/2002 | Kubicko | A21C 1/145 | 241/191 |
| 6,490,872 B1 * | 12/2002 | Beck | A23G 9/045 | 62/303 |
| 6,494,055 B1 * | 12/2002 | Meserole | A23G 9/045 | 366/305 |
| 6,510,704 B1 * | 1/2003 | Russell | A23G 9/12 | 366/251 |
| 6,553,779 B1 * | 4/2003 | Boyer | A23G 9/045 | 222/146.6 |
| 6,613,374 B1 * | 9/2003 | Fayard | A23G 9/22 | 426/516 |
| 6,637,214 B1 * | 10/2003 | Leitzke | A23G 9/163 | 62/342 |
| 7,621,669 B1 * | 11/2009 | Gerber | A23G 9/12 | 366/177.1 |
| 7,754,266 B2 * | 7/2010 | Waletzko | A23G 9/06 | 426/519 |
| 8,857,197 B1 * | 10/2014 | Fisher | A23L 3/375 | 62/66 |
| 9,335,082 B2 * | 5/2016 | Gist | A23G 9/045 | |
| 10,358,284 B2 * | 7/2019 | Fonte | B65D 51/32 | |
| 2001/0037656 A1 * | 11/2001 | Ross | A23G 9/08 | 62/342 |
| 2002/0048626 A1 * | 4/2002 | Miller | A23G 9/045 | 426/590 |
| 2002/0144608 A1 * | 10/2002 | Jones | A23G 9/22 | 99/517 |
| 2003/0150227 A1 * | 8/2003 | Ross | A23G 9/16 | 62/188 |
| 2003/0150236 A1 * | 8/2003 | Ross | A23G 9/12 | 62/342 |
| 2004/0003620 A1 * | 1/2004 | Cocchi | A23G 9/22 | 62/348 |
| 2005/0037110 A1 * | 2/2005 | Windhab | A23G 9/20 | 426/100 |
| 2005/0081554 A1 * | 4/2005 | Ross | A23G 9/12 | 62/342 |
| 2005/0106301 A1 * | 5/2005 | Jones | A23G 9/04 | 426/524 |
| 2005/0132902 A1 * | 6/2005 | D'Arcangelis | A23G 9/20 | 99/455 |
| 2005/0230418 A1 * | 10/2005 | Campbell | A23G 9/20 | 222/95 |
| 2006/0102016 A1 * | 5/2006 | Ulrich | A23G 9/04 | 99/452 |
| 2006/0159821 A1 * | 7/2006 | Brisson | A23G 9/06 | 426/565 |
| 2006/0233919 A1 * | 10/2006 | Quail | A23G 9/22 | 426/101 |
| 2006/0263490 A1 * | 11/2006 | Wall | A23G 9/20 | 426/101 |
| 2006/0277936 A1 * | 12/2006 | Norden | A23G 9/22 | 62/340 |
| 2007/0110872 A1 * | 5/2007 | Gerber | A23G 9/20 | 426/565 |
| 2007/0251260 A1 * | 11/2007 | Baxter | A21B 7/00 | 62/342 |
| 2007/0262081 A1 * | 11/2007 | Feola | A23G 9/08 | 221/8 |
| 2007/0267087 A1 * | 11/2007 | Jones | A23G 9/22 | 141/18 |
| 2008/0011009 A1 * | 1/2008 | Timmons | A23G 9/06 | 62/343 |
| 2008/0087026 A1 * | 4/2008 | Allin | A23G 9/045 | 62/68 |
| 2008/0257173 A1 * | 10/2008 | Radi | A23G 9/22 | 99/455 |
| 2009/0028764 A1 * | 1/2009 | Le Bail | A23G 9/22 | 422/245.1 |
| 2009/0053375 A1 * | 2/2009 | Johnson | A23G 9/04 | 426/474 |
| 2009/0117242 A1 * | 5/2009 | Kateman | A23G 9/08 | 426/474 |
| 2009/0120306 A1 * | 5/2009 | DeCarlo | A23G 9/12 | 99/485 |
| 2009/0142466 A1 * | 6/2009 | Robinson | A23G 9/04 | 426/565 |
| 2009/0191318 A1 * | 7/2009 | Cocchi | A23G 9/04 | 426/231 |

(56) References Cited

U.S. PATENT DOCUMENTS

| | | | |
|---|---|---|---|
| 2009/0323462 A1* | 12/2009 | Cocchi | A23G 9/12 366/147 |
| 2010/0062128 A1* | 3/2010 | Khoo | A23F 5/465 426/474 |
| 2010/0175565 A1* | 7/2010 | Jejcic | A23G 9/12 99/455 |
| 2011/0011887 A1* | 1/2011 | Zaniboni | A23G 9/22 222/23 |
| 2011/0088869 A1* | 4/2011 | Wadle | A23G 9/22 165/64 |
| 2011/0108569 A1* | 5/2011 | Jones | A23G 9/22 222/1 |
| 2011/0266302 A1* | 11/2011 | Masse | F16K 3/0209 222/1 |
| 2012/0096876 A1* | 4/2012 | Ravji | A23G 9/08 62/68 |
| 2012/0104046 A1* | 5/2012 | Wadle | A23G 9/12 62/342 |
| 2012/0250453 A1* | 10/2012 | Kozlowski | A23G 9/224 366/343 |
| 2012/0312049 A1* | 12/2012 | Downs, III | A23G 9/20 62/340 |
| 2013/0058184 A1* | 3/2013 | Hansen | A23G 9/22 366/138 |
| 2013/0095223 A1* | 4/2013 | Nayini | A23L 3/375 426/565 |
| 2013/0177691 A1* | 7/2013 | Berghoff | A23G 9/06 426/565 |
| 2013/0251869 A1* | 9/2013 | van Pomeren | A23G 9/16 426/474 |
| 2013/0340456 A1* | 12/2013 | Hoare | B01F 7/00033 62/126 |
| 2014/0102128 A1* | 4/2014 | Jejcic | A23G 9/12 62/342 |
| 2014/0158710 A1* | 6/2014 | Lunn | B67D 3/0012 222/63 |
| 2014/0305618 A1* | 10/2014 | Newton | F28D 7/106 165/154 |
| 2014/0335232 A1* | 11/2014 | Beth Halachmi | A23G 9/00 426/87 |
| 2015/0129611 A1* | 5/2015 | Vulpitta | B67D 1/0001 222/101 |
| 2015/0173391 A1* | 6/2015 | Nehrboss | A23G 9/22 62/340 |
| 2015/0223490 A1* | 8/2015 | Cigolini | A23G 9/12 99/455 |
| 2015/0253067 A1* | 9/2015 | Bucceri | B65D 85/78 62/66 |
| 2015/0264959 A1* | 9/2015 | Colwell | F25C 5/12 241/25 |
| 2016/0128353 A1* | 5/2016 | Cocchi | A23G 9/22 99/467 |
| 2016/0192675 A1* | 7/2016 | Abu-Ali | A23G 9/12 426/112 |
| 2016/0338379 A1* | 11/2016 | Binley | A23G 3/0097 |
| 2017/0015541 A1* | 1/2017 | Vulpitta | B67D 1/0001 |

* cited by examiner

SYSTEM AND METHOD FOR MAKING ICE CREAM

FIELD OF THE INVENTION

Embodiments of the present invention, generally relate to a system and method for making ice cream, and in particular relate to a pod-based system and method having in-built whisking attachments for making the ice cream.

BACKGROUND

Ice creams are consumed and enjoyed by people of almost all age groups. Currently, ice creams are made by two methods. One of the methods is known as continuous method, and another method is known as batch method.

A continuous system typically includes an air injection system that pressurizes the system and begins to introduce air into the mixture, which is then passed through a continuous freezer (heat exchanger). In this dynamic heat exchanger, the mixture contacts the sides of the heat exchanger and is continuously scraped from the sides as it freezes and simultaneously pushed inward and forward, while adding air into the mixture, so that more of the unfrozen solution contacts the frozen sides of the heat exchanger. Overrun is a measure of aeration that is of particular importance in ice cream making as it affects the organoleptic properties, stability, and profitability of ice cream. It is customarily defined by following equation.

Overrun=((volume of finished ice cream−volume of mixture used to make the ice cream)/volume of mixture used to make the ice cream)×100%.

The freezer (heat Exchanger) continuously and dynamically freezes the mixture and produces a soft serve ice cream, which is then filled into containers and then sent to a blast freezer to harden. The ice cream, thus produced, is required to be sent to the blast freezer for 45-60 minutes on average to freeze it quickly, harden it, and make it stable to ship and sell. The continuous system thus requires extensive upfront cost, sanitation, and maintenance for successful operation. Hence, continuous ice cream making systems are expensive, large, and usually limited to large scale ice cream manufacturers.

Batch ice cream systems vary in size and can range from small counter top machines to intermediate size store/commercial size machines. In the commercial version of the systems, a liquid ice cream mixture flows from a reservoir into a heat exchanger beater chamber with a beater that incorporates air into the mixture and pushes/spreads the unfrozen portion of the mixture into a thin layer against the frozen walls of the chamber (heat exchanger) while simultaneously scraping away the frozen layer from the surface and pushing it inwards to mix with the rest of the mixture. After a while, the mixture partially freezes and produces a short shelf life soft serve ice cream that must be either consumed immediately or rapidly hardened to increase shelf life and preserve texture.

Home ice cream systems use a very similar system to the batch ice cream system, except that, usually, they have no reservoirs and the freezing/scraping chamber has to be manually loaded. The resulting product is very similar to the commercial batch systems in shelf life and hardness.

Current home and small scale ice cream making systems are slow, cumbersome, and messy. Further, they require sanitation, produce low overrun and low stability products that are difficult to customize. Furthermore, by necessity, these products only produce soft ice cream, as allowing the ice cream to harden would lock up the system and potentially burn out the drive motors.

Both continuous and batch systems require motion during freezing to combat the drop in thermal conductivity that occurs as the outer layers in contact with the freezing system freeze as water ice has lower thermal conductivity than liquid water in solutions of the same composition.

Further, freezing ice cream and other desserts statically in traditional shaped containers results in slow freezing due to the freezing pattern where the outer layers freeze first which reduces their thermal conductivity, concentrates dissolves solids and slows down the freezing of internal portions of the mix as more solids migrate inward, and these central portions become highly concentrated.

New non-traditional ice cream mixtures require pre-whisking before freezing. Whisking the mixture, using traditional methods, would require opening the pods which in an automatic system would cause product to get onto the system. This, in turn, would require cleaning and sanitation after each use. But, having to clean and sanitize the system after every use will reduce the throughput of the system and increase the difficulty of use.

Therefore, there is an unmet need for an improved system and a method for making ice cream which solves above mentioned problems associated with traditional ice cream making systems.

SUMMARY

According to an aspect of the present disclosure, a system for making ice cream is provided herein. The system includes a pod to hold the mixture, a whisking component attached to the pod, and a freezing component. The mixture may optionally include a powder mixture, flavoring liquid, and a stabilized fluid. The whisking component is configured to whisk the mixture and produce a whisked mixture in the form of a semi-stable foam. In an embodiment, the whisking component is attached to the lid of the pod or body of the pod. In another embodiment, the whisking component is free moving whisk ball. The freezing component is configured to freeze the whisked mixture and produce ice cream.

According to another aspect of the present disclosure, a method for making ice cream is provided. The method includes receiving a pod having a mixture. The method further includes whisking the mixture by a whisking component attached to the pod. The method further includes freezing the whisked mixture to produce ice cream.

The present invention advantageously provides a whisking attachment that provides many advantages. First, it mixes the contents or ingredients of the pod 1. Second, it helps chilling the contents of the pod by swirling liquid portions of the contents in contact with cold side of the walls. The chilling of the contents of the pod facilitates better whipping. Third, it aerates and whips the ingredients of the container into foam.

According to an embodiment of the present invention, various pod designs provided by the present invention provides many advantages. First, they facilitate mixing by acting as static mixers. Second, they increase freezing speed and facilitate rapid static freezing by allowing freezing rods and protrusions to be inserted into the middle of the liquid without coming into contact with the contents of the pod. They reduce depth and width of parts of the ice cream mixture between freezing contact surfaces. Third, they increase freezing rate by increasing surface area of the container. Fourth, they act as containers that hold and separate powder or liquid or capsule intended for combining with rest of the contents of the pod during whisking. These containers in combination with mobile or stationary portions of the freezing system (i.e., plunger) act as part of an injection system during operation that injects contents of the depository into the pod.

The preceding is a simplified summary to provide an understanding of some aspects of embodiments of the present invention. This summary is neither an extensive nor exhaustive overview of the present invention and its various embodiments. The summary presents selected concepts of the embodiments of the present invention in a simplified form as an introduction to the more detailed description presented below. As will be appreciated, other embodiments of the present invention are possible utilizing, alone or in combination, one or more of the features set forth above or described in detail below.

BRIEF DESCRIPTION OF THE DRAWINGS

The above and still further features and advantages of embodiments of the present invention will become apparent upon consideration of the following detailed description of embodiments thereof, especially when taken in conjunction with the accompanying drawings, and wherein.

To facilitate understanding, like reference numerals have been used, where possible, to designate like elements common to the figures.

DETAILED DESCRIPTION

As used throughout this application, the word "may" is used in a permissive sense (i.e., meaning having the potential to), rather than the mandatory sense (i.e., meaning must). Similarly, the words "include", "including", and "includes" mean including but not limited to.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

Figure 1:
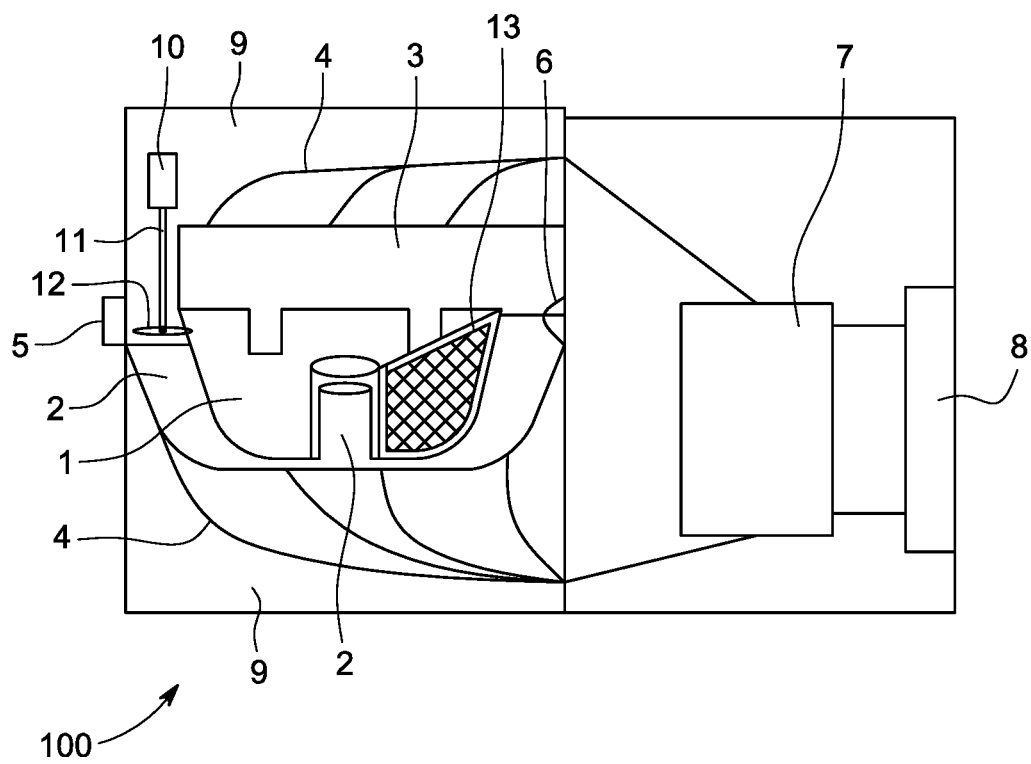
FIG. 1 illustrates a schematic diagram of an ice cream making system utilizing contact plate freezing technology with rotatable pod equipped with a built-in whisk, mixer attachment, according to an embodiment of the present invention.

FIG. 1 illustrates a schematic representation of an ice cream making system 100, according to an embodiment of the present invention. The ice cream making system 100 utilizes contact plate freezing technology with rotatable pod equipped with a built-in whisk. As shown in FIG. 1, the system 100 includes a pod 1, bottom contact freezing plate 2, top contact freezing plate 3, coolant lines 4, a latch 5, a hinge 6, a compressor 7, a condenser 8, an insulated chamber 9, a variable speed drive motor 10, a drive shaft 11, a retractable drive wheel 12, and a stationary whisk/mixer 13.

The pod 1 contains powder mixture and flavouring/variegates. The powder mixture and an appropriate liquid (for example, water, milk, cream etc.) can be combined into the pod 1 to form semi-stable foam, and the semi-stable foam can be freezed to produce ice cream.

The pod 1 can be made of a variety of materials. In the preferred mode, the pod 1 is made of thermally conductive and strong materials, such that the pod can sustain the shape at low thickness. Examples of materials include stainless steel, aluminum, glass and special plastics.

Figure 2:
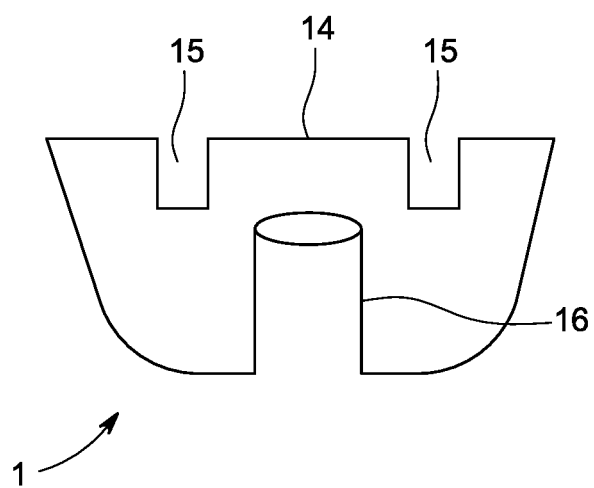
FIG. 2 illustrates a schematic diagram of passive pod design with cooling designs.

According to an embodiment of the present invention, the pod 1 can have a plurality of shapes. In an embodiment, the pod 1 is active pod and includes a whisking attachment to whisk the contents of the pod 1. In another embodiment, the pod 1 can be a passive pod without any whisking attachment, as shown in FIG. 2. The passive pod includes resealable lid 14, hollow indentations 15 where cooling rings and rods can fit, and hollow central shaft 16.

According to an embodiment of the present invention, the active pod can have a plurality of shapes depending upon different types of whisking attachments. The whisking attachment can include following shapes, but not limited to, horizontal or vertical wire bulb shaped attachment, horizontal or flat wire whisk shape, horizontal spatula with mesh in the middle, horizontal spatula with hole in the metal or any other flat shape in an arc, curved or irregular shape. The horizontal spatula with the hole in the middle with a flap behind the hole acts as a back stop to fluid and a sharp forward edge, where spatula contacts the surfaces of the container on any or all sides.

Further, the freestanding whisk can include a plurality of shapes but not limited to a wire ball, a sold ball with fins, a semi solid ball with holes, wire ball with solid ball inside to weight it down, a magnetic metal coated in plastic or Teflon or all of these iterations in elongated oval or pill shape.

Further, according to an embodiment of the present invention, the whisking attachment attached to the active pod 1 can have a plurality of geometric designs. The geometric designs comprise one or combination of a plurality of shapes including, but not limited to, cylindrical, ring shaped, partial ring (semi-circular), arc shape, oval, rectangular, elliptical, needle shaped, square, multi-sided, octagonal or irregular.

Figure 3:
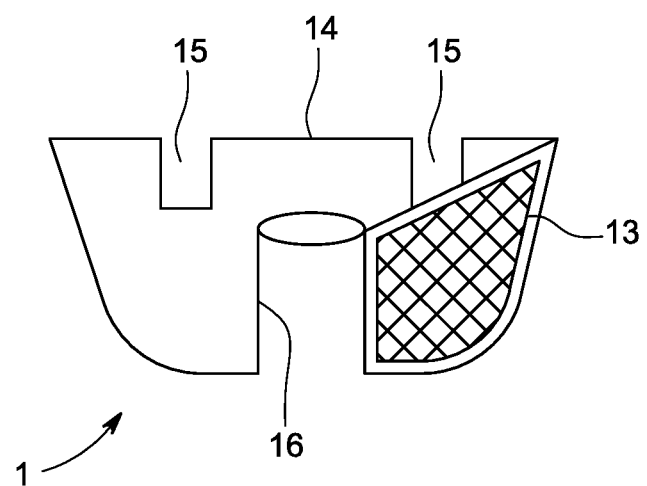
FIG. 3 illustrates a schematic diagram of active pod design with vertical whisk mixer attachment attached to the body of the pod, according to an embodiment of the present invention.

Further, in an embodiment of the present invention, the whisking attachment can be attached to the body of the pod 1, as shown in FIG. 3, wherein the stationary whisk/mixer 13 is attached to the body of the pod 1.

Figure 4:
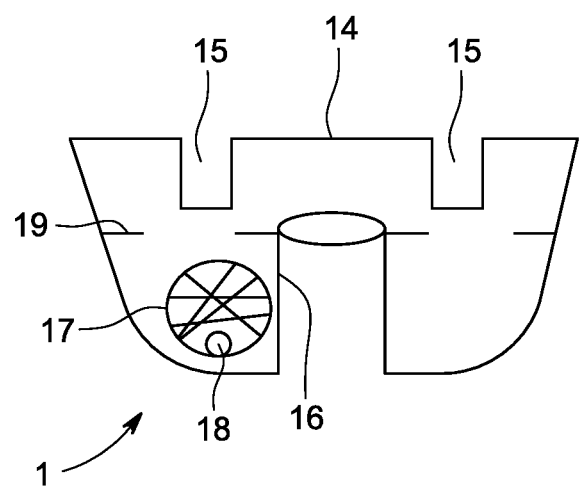
FIG. 4 illustrates a schematic diagram of active pod design with free moving whisk ball, according to another embodiment of the present invention.

In another embodiment, the whisking attachment can be free moving whisk ball 17, as shown in FIG. 4. In this embodiment, the free moving weight 18 is weighed to have different density than the mixture which allows it to rotate against the mixture (during whisking, explained later) or to stay stationary while the mixture passes through it. The restrictors 17 are configured to prevent the ball 17 from leaving the pod 1. In an embodiment, the pod 1 is made tapered, so that the free moving whisk cannot escape from the pod 1 after freezing (so that it cannot be accidently consumed by the user).

Figure 5:
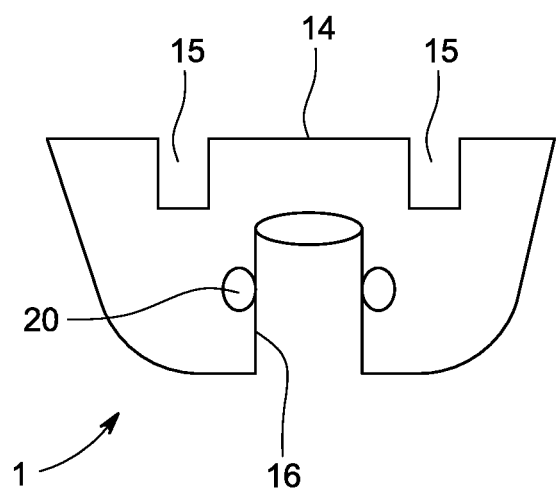
FIG. 5 illustrates a schematic diagram of active pod design with built in wire-loop (spring) whisk mixer, according to another embodiment of the present invention.

In another embodiment, the whisking attachment can be built in form of a wire-loop (spring) 20, as shown in FIG. 5.

Figure 6:
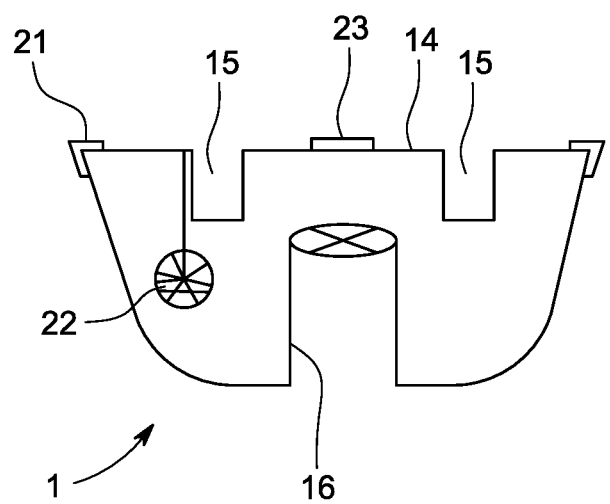
FIG. 6 illustrates a schematic diagram of active pod design with movable lid plate and a whisk mixer attached to the lid plate, according to another embodiment of the present invention.

In another embodiment, the whisking attachment can be attached to the lid of the pod 1, as shown in FIG. 6. Seal 21 is configured to allow the central plate to rotate. Whisk/mixer 22 and a connector 23 are attached to the lid of the pod 1.

Figure 7:
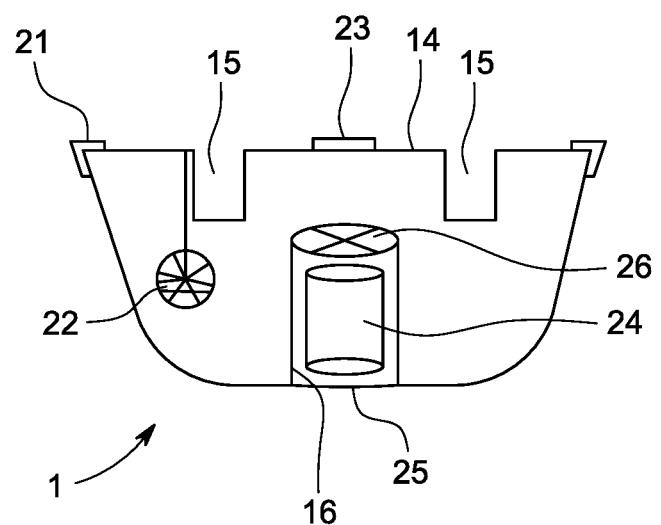
FIG. 7 illustrates a schematic diagram of active pod design with built in powder capsule, according to another embodiment of the present invention.

In another embodiment, the whisking attachment can be built in a powder capsule, as shown in FIG. 7. A powder capsule 24 is kept inside a flexible septum seal 25 and a weal seal 26 is placed over the rigid support of the capsule 24.

The system 100 is used for making ice cream. In operation of making the ice-cream, first the user opens the pod 1 and adds the powder mixture, flavoring or liquid or whatever ingredients he wants in the ice-cream. Then, he reseals the pod 1.

In an embodiment, the user manually whisks the contents of the pod 1 outside the pod, places the contents back into the pod 1, and seals it before placing into the freezing system. In this embodiment, the whisking is done outside of the freezing system and done separately by either the operator or a companion system or both. The whisking can be done inside the pod or in a separate container and then poured into the pods and the pods are recapped (or resealed). Since, the whisking is done separately; this semi-automatic system doesn't need the whisking motor or specialized connectors. Further, the semi-automatic system can use pods without any built in whisking capabilities.

Next, the pod 1 is inserted into the system 100. In an embodiment of the present invention, the pod 1 can be inserted into the system according to a number of methods. In one method, a portion of the system 100 is partially detached and the pod 1 is inserted into the insulated chamber 9. Then, the portion of the system 100, that was opened, is closed back up again and the seal is created.

In another method of inserting the pod 1 into the system 100, a drawer is ejected from the system 100, into which the pod 1 is placed, and then the drawer is reinserted into the system 100. The drawer may be reinserted either manually or automatically. In yet another method of inserting the pod 1 into the system 100, the lid is opened and the pod 1 is slided into grooves of the freezing plates 2 and 3.

Once the pod 1 has been inserted into the insulated chamber 9, the contents of the pod 1 are mixed and whisked. According to an embodiment of the present invention, the contents of the pod 1 can be mixed and whisked according to a plurality of methods depending upon the plurality of pod designs.

In one method of mixing and whisking, as shown in FIG. 1, the whisking attachment is attached to the body of the pod 1. In this method, the pod 1 is connected to the drive shaft 11 built into the system 100, and the drive shaft 11 is connected to the variable speed drive motor 10. In an embodiment, the variable speed drive motor 10 is programmable, and it rotates according to a prescribed program. In this method, the whole pod 1 is rotated either vertically or horizontally, or at an angle to achieve mixing and whisking.

Figure 8:
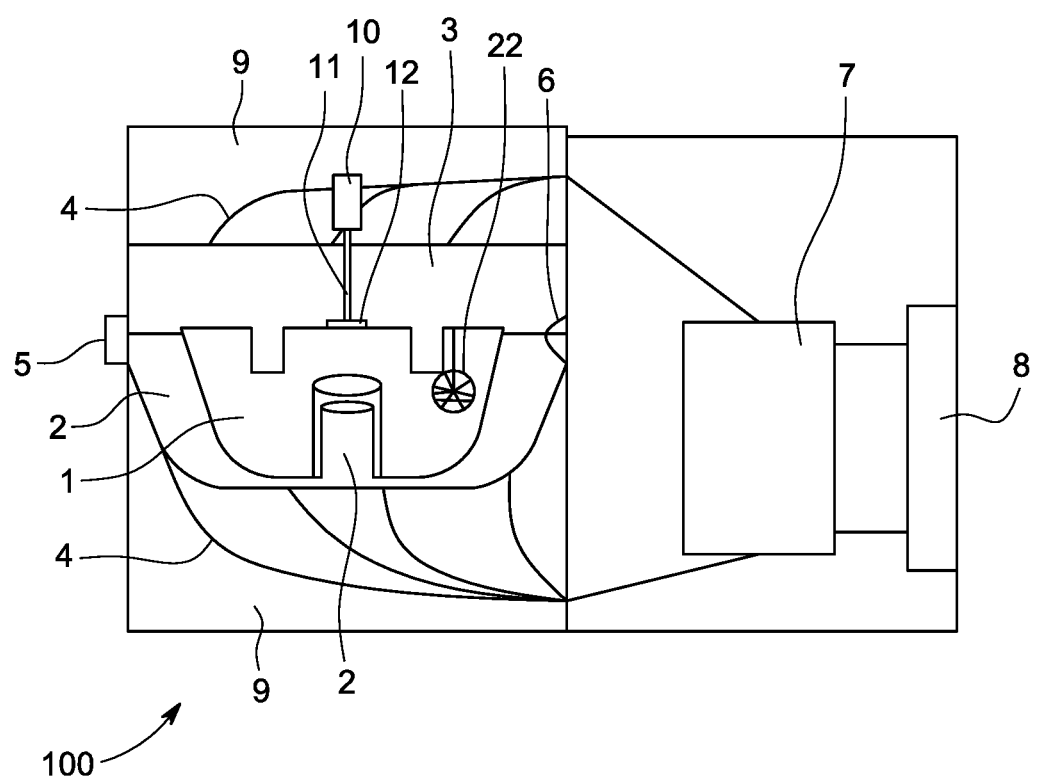
FIG. 8 illustrates a schematic diagram of an ice cream making system, with pod in holder with whisking attachment attached to a rotatable lid, according to another embodiment of the present invention.

In another method of mixing and whisking, as shown in FIG. 8, a whisking head is attached to the lid of the pod 1. In this method, the whisking head 22 and a free moving plate in the lid of the pod 1 are connected through a connector 12 to the variable speed motor 10. The connector 12 is located on the surface or edges of the lid. The variable speed motor 10 is built in the system 100. In an embodiment, the variable speed motor 10 is programmable. The variable speed motor 10 then rotates according to a prescribed program, which rotates the free moving plate of the lid and the whisking head attached to the lid of the pod 1.

Figure 9:
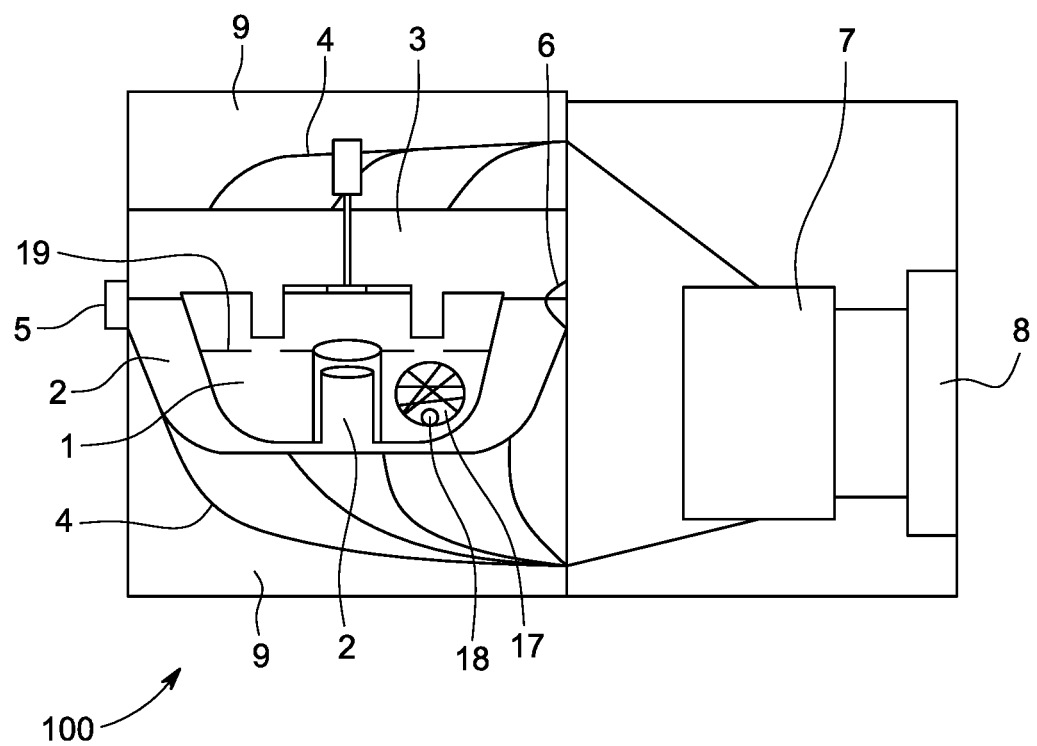
FIG. 9 illustrates a schematic diagram of an ice cream making system with contact freezers and a magnetic drive system drive a magnetic or magnet containing whisk head, according to yet another embodiment of the present invention.
Figure 10:
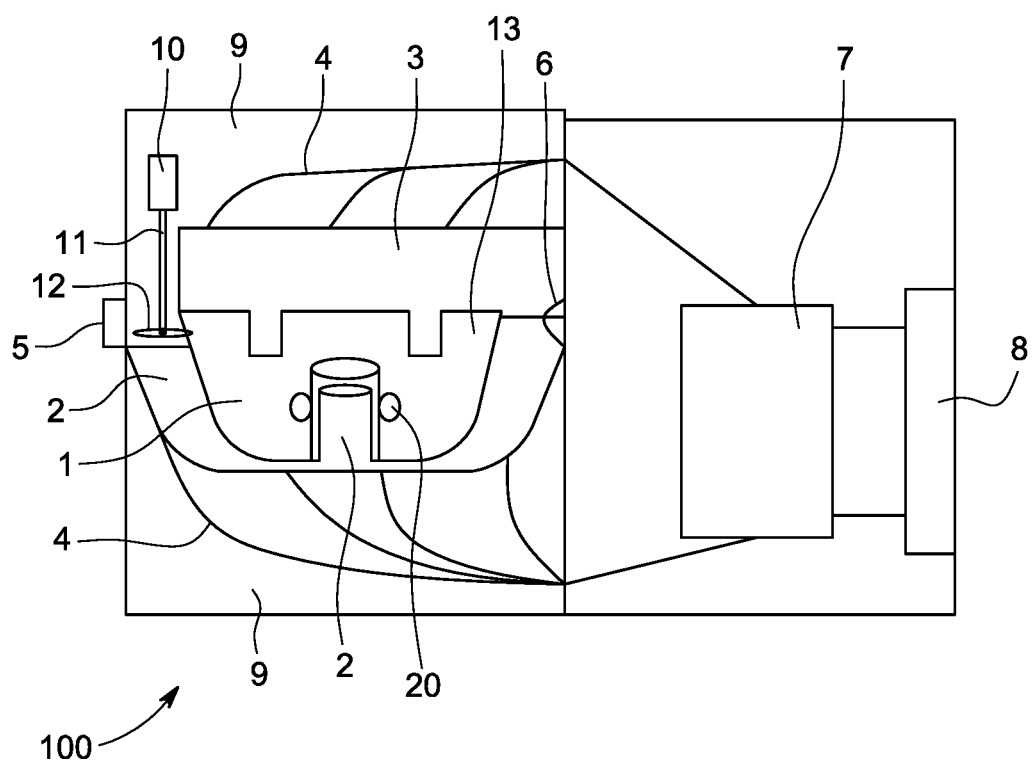
FIG. 10 illustrates a schematic diagram of an ice cream making system, with pod in holder with whisking attachment attached to a wire loop whisk mixer, according to another embodiment of the present invention.

In yet another method of mixing and whisking, as shown in FIG. 9, a magnetic and free-moving whisking head 17 is sealed inside the pod 1. In this method, a stationary or rotary magnetized plate 12 is connected to the motor 10 through the connector 11. The magnetized plate 12 is activated by the motor 10 and the magnetized plate 12 causes the free-moving whisking head 17 inside the sealed pod to rotate along a pre-set path to achieve mixing and whisking of the contents of the pod 1. In yet another method of mixing and whisking, as shown in FIG. 10, the whisking attachment is attached to a wire loop whisk mixer 20 to achieve the mixing and whisking of the contents of the pod 1.

Figure 11:
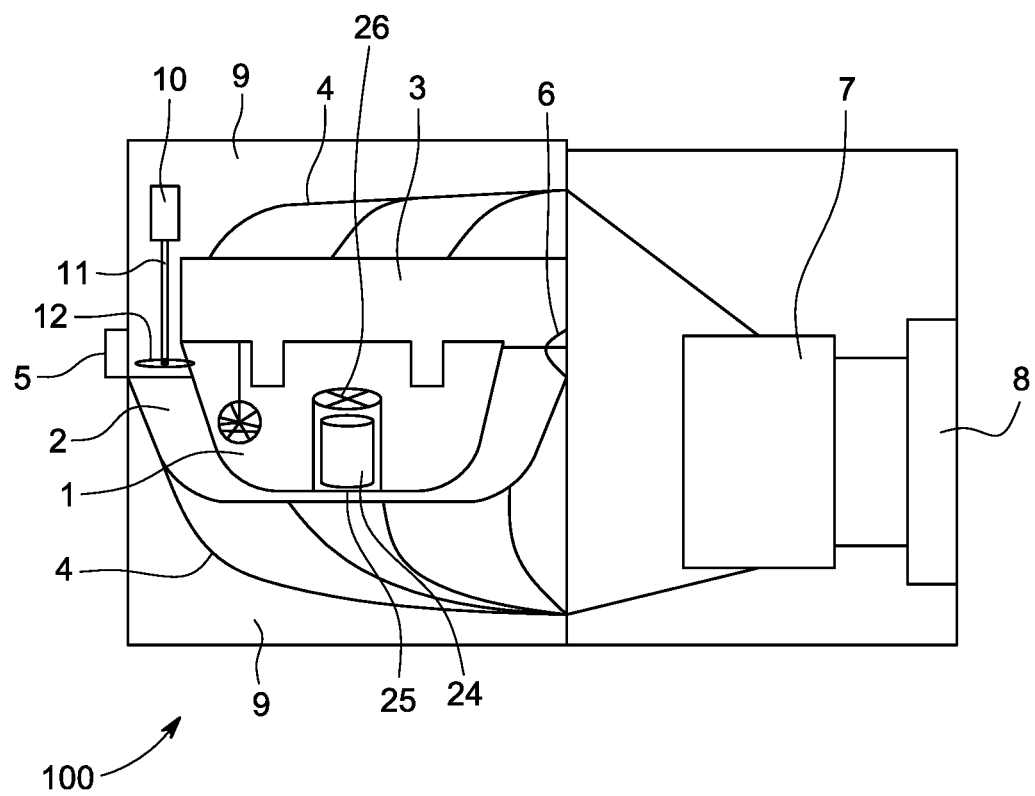
FIG. 11 illustrates a schematic diagram of an ice cream making system, with pod in holder with whisking attachment attached to a built in powder capsule, according to another embodiment of the present invention.

In yet another method of mixing and whisking, wherein the pod 1 is equipped with a depository 24 (shown in FIG. 11), a mixture such as powder or other materials is kept in a capsule inside the depository 24. The depository 24 is sealed on the outside with a septum or foil seal 25 and on the inside with a weakened seal 26. The depository 24 is equipped with a cutter or sharp protrusion. When the pod 1 is inserted into the system 100, a cooling shaft is pushed into the depository 24 which in turn pushes the outer seal or septum 25 against the contents of the capsule, which pushes against the weakened seal 26 and the support, thus breaking the capsule and the weak seal and releasing the contents of the capsule into the contents of the pod 1. The outer septum 25 and the skin of the capsule act as a new seal that keeps the freezing rod from coming into contact with the contents of the pod 1.

According to an embodiment of the present invention, the whisking and mixing of the contents of the pod 1 serves may purposes. First, it mixes the contents or ingredients of the pod 1. Second, it helps chilling the contents of the pod 1 by swirling liquid portions of the contents in contact with cold side of the walls. The chilling of the contents of the pod 1 facilitates better whipping. Third, it aerates and whips the ingredients of the container into foam. Fourth, it acts as a scraper of the side walls of the pod 1.

According to an embodiment of the present invention, various pod designs provided by the present invention provides many advantages. First, they facilitate mixing by acting as static mixers. Second, they increase freezing speed by allowing freezing rods and protrusions to be inserted into the middle of the liquid without freezing coming into contact with the contents of the pod 1. They reduce depth and width of parts of the ice cream mixture between freezing contact surfaces. Third, they increase freezing rate by increasing surface area of the container. Fourth, they act as containers that hold and separate powder or liquid or capsule intended for combining with rest of the content s of the pod 1 during whisking. These containers in combination with mobile or stationary portions of the freezing system (i.e., plunger) act as part of an injection system during operation that injects contents of the depository into the pod 1.

Thus, the whisking action achieves several benefits. It slowly mixes the ingredients (for pods containing separate powder and liquid), while chilling the liquid portion which accelerates whisking and improves overrun. Further, the contents of the pod are whisked into the desired semi-solid foam.

Further, depending on the design of the pod, protrusions from the chamber such as central cooling shaft and a cooling ring fit into the specially designed indentations built into the pod to accelerate freezing. These protrusions (especially the center shaft) can also act as plungers that help disperse powder into the liquid inside the pod.

Next, after mixing and whisking of the contents of the pod 1, they are required to be frozen to become ice cream. According to an embodiment of the present invention, there are pluralities of methods, which can be utilized to freeze the contents of the pod 1.

Figure 12:
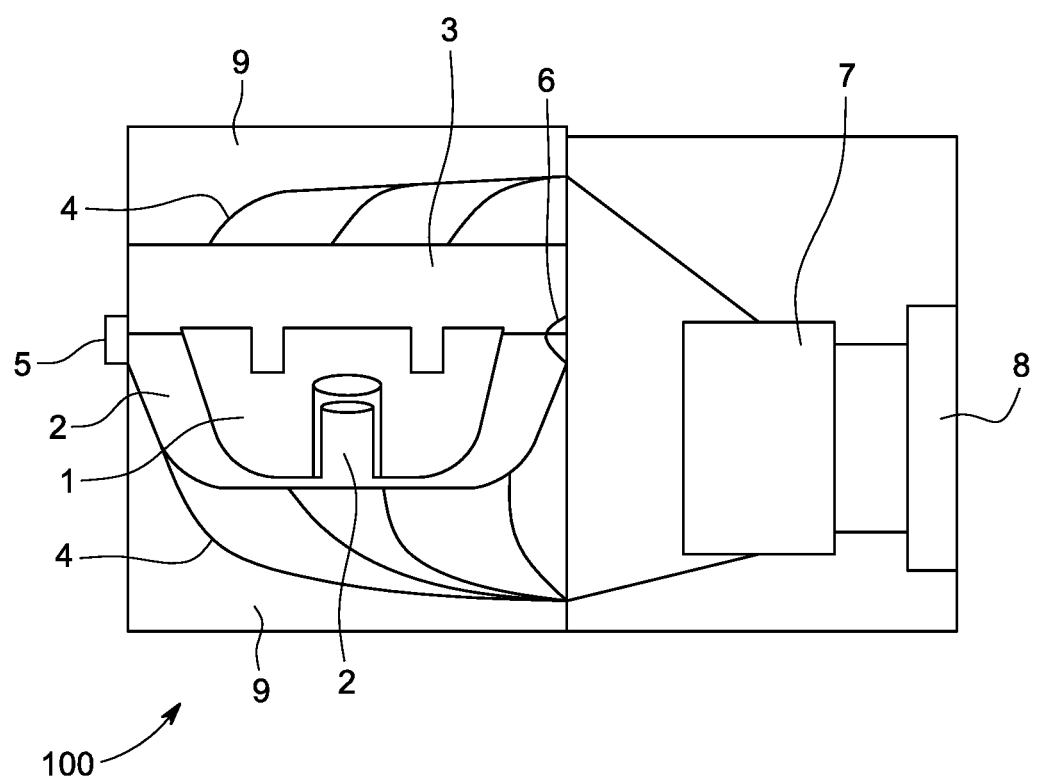
FIG. 12 illustrates a schematic diagram of an ice cream making system utilizing contact plate freezer with pod in holder, according to an embodiment of the present invention.

In an embodiment, as shown in FIG. 12, a contact freezing system is employed where coolant lines flow through the walls or plates containing the pod 1. The contact plates with coolant flowing through them are brought into contact with the all or parts of the pod.

Figure 13:
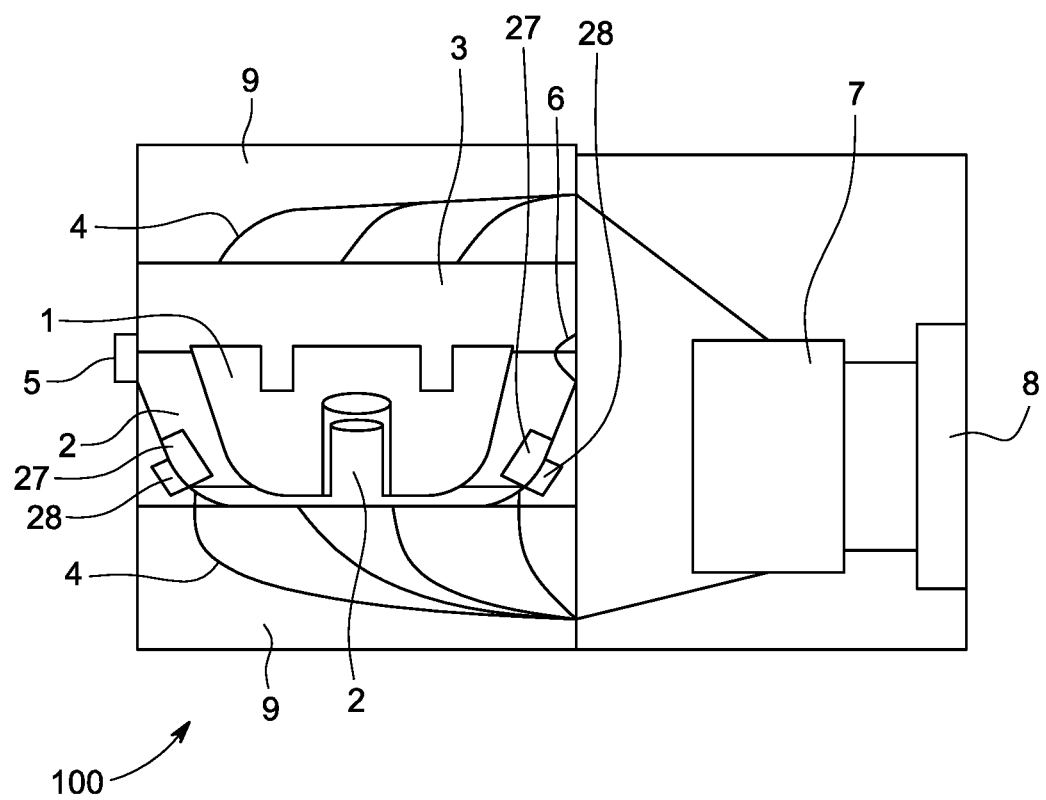
FIG. 13 illustrates a schematic diagram of an ice cream making system utilizing contact plate and blast freezer freezing systems with pod in holder, according to another embodiment of the present invention.

In another embodiment, as shown in FIG. 13, a blast freezing system is employed to freeze the contents of the pod 1. The blast freezing system comprises an evaporator heat exchanger (cooler) 27 and a fan 28. The fan 28 is configured to provide high speed, very low temperature cooled air against all or parts of the pod 1.

Figure 14:
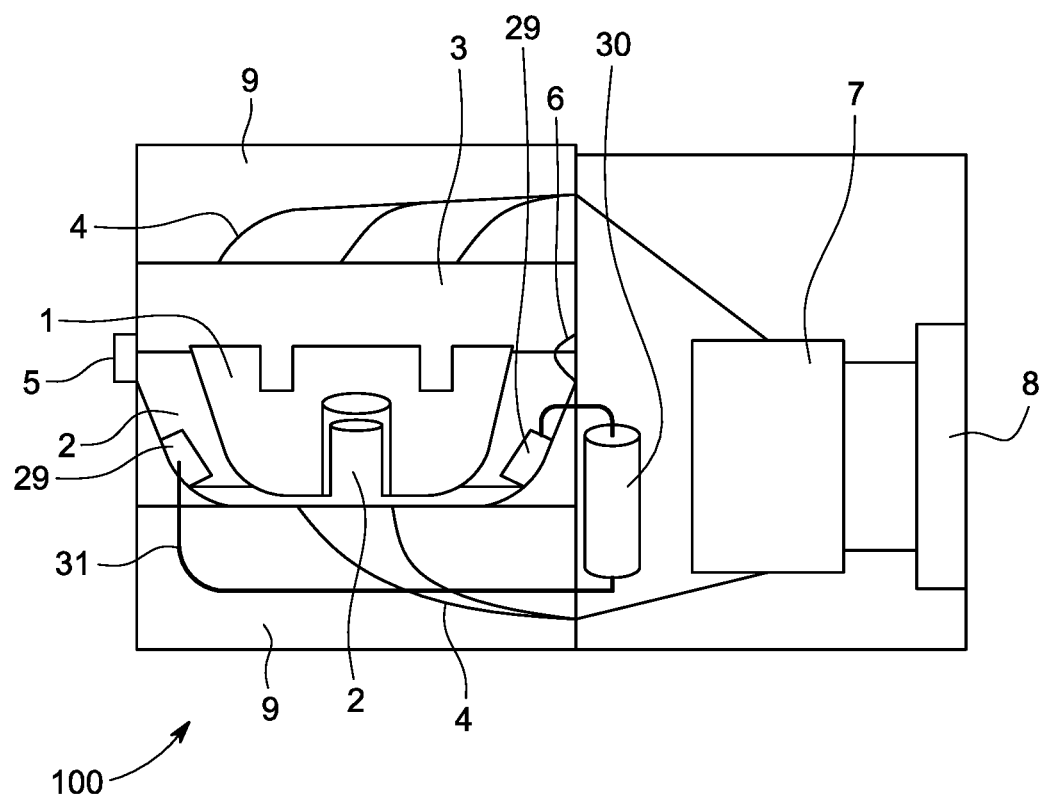
FIG. 14 illustrates a schematic diagram of an ice cream making system utilizing contact plate and compressed $CO_2$/dry ice freezing technology with pod in holder, according to yet another embodiment of the present invention.

In yet another embodiment, as shown in FIG. 14, dry ice system is employed to freeze the contents of the pod 1. In one embodiment, the dry ice can be loaded into the system 100. In another embodiment, the dry ice is created in contact with the pod 1 using a $CO_2$ nozzle 29, compressed $CO_2$ canister 30, compressed $CO_2$ lines 31, and a membrane where dry ice forms.

After freezing, the system warms up the hard frozen ice cream to target serving temperature so that it is immediately ready to consume and the user doesn't need to wait for it to soften up. Next, the pod is either ejected from the system 100 or removed ready for consumption.

Figure 15:
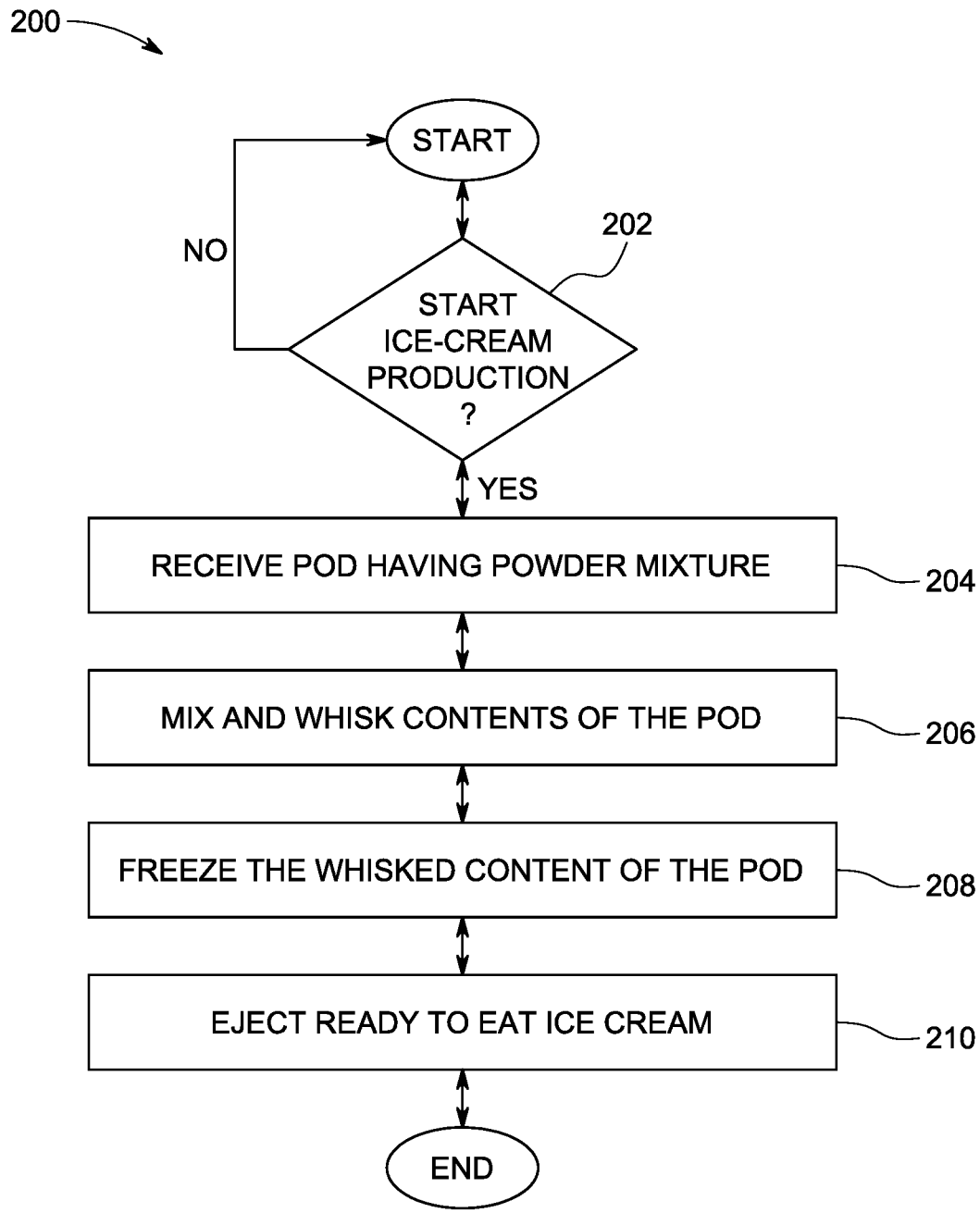
FIG. 15 depicts an exemplary flowchart illustrating a method for making ice cream, according to an embodiment of the present invention.

FIG. 15 illustrates an exemplary flowchart 200 for a method of making ice cream, according to an embodiment of the present disclosure.

Initially, at step 202, system 100 displays a message on a display panel and ask whether the ice cream production is to be started. A user/operator provides his/her desired input to the system 100. The system 100 receives the input and proceeds to step 202, if the user provided 'Yes' input. Else, the method 200 returns to start.

At step 204, the pod 1 is received by the system 100. The pod 1 may include powder mixture, flavouring or an appropriate liquid (for example, water, milk, cream, etc.) or whatever ingredients the user wants to have in the ice-cream.

According to an embodiment of the present invention, the pod 1 may be received by the system 100 according to a plurality of methods. In one method, a portion of the system 100 is partially detached and the pod 1 is received into the insulated chamber 9. Then, the portion of the system 100, that was opened, is closed back up again. Then, the seal is created by the system 100 and the receiving of the pod 1 concludes.

In another method of receiving the pod 1 into the system 100, a drawer is ejected by the system 100, into which the pod 1 is received. Then the drawer is reinserted into the system 100. In an embodiment, the drawer may be manually reinserted. In another embodiment, drawer may be reinserted automatically. Then the seal is created by the system 100 and the receiving of the pod 1 concludes.

In yet another method of receiving the pod 1 into the system 100, the lid may be opened by the system 100 and the pod 1 may be received into the grooves of the freezing plates 2 and 3. Then the seal is created by the system 100 and the receiving of the pod 1 concludes.

At step 206, the contents of the pod 1 are mixed and whisked by the system 100. According to an embodiment of the present invention, the contents of the pod 1 can be mixed and whisked by the system 100, according to a plurality of methods depending upon the plurality of pod designs. In one method of mixing and whisking, wherein the whisking attachment is attached to the body of the pod 1, the pod 1 is connected to the drive shaft 11 by the system 100, and the drive shaft 11 is connected to the variable speed drive motor 10. The variable speed motor 10 rotates the drive shaft 11 and this activates the whisking attachment attached to the body of the pod 1.

In another method of mixing and whisking, wherein the whisking head is attached to the lid of the pod 1, the whisking head and a free moving plate in the lid of the pod 1 are connected through a connector 12 to the variable speed motor 10 by the system 100. In an embodiment, the variable speed motor 10 is then rotated by the system 100 according to the prescribed program, which rotates the free moving plate of the lid and the whisking head attached to the lid of the pod 1.

In yet another method of mixing and whisking, wherein the magnetic and free-moving whisking head is sealed inside the pod 1, a stationary or rotary magnetized plate 12 is connected to the motor 10 through the connector 11 by the system 100. The magnetized plate 12 is activated by the motor 10 and the magnetized plate 12 causes the free-moving whisking head inside the sealed pod to rotate along a pre-set path to achieve mixing and whisking of the contents of the pod 1.

According to an embodiment of the present invention, the step 206 of whisking and mixing of the contents of the pod 1 mixes the contents or ingredients of the pod 1. Further, the step 206 also helps chilling the contents of the pod 1 by swirling liquid portions of the contents in contact with cold side of the walls, which facilitates chilling of the contents of the pod 1 for better whipping. Furthermore, the step 206 also aerates and whips the ingredients of the container into desired semi-solid foam.

At step 208, the contents of the pod are freezed by the system 100. According to an embodiment of the present invention, the system 100 may freeze the contents according to a plurality of methods.

In one method, the system 100 may employ a contact freezing system, where coolant lines flow through the walls or plates containing the pod 1. The contact plates with coolant lines flowing through them are brought into contact with the all or parts of the pod.

In another method, the system 100 may employ a blast freezing system to freeze the contents of the pod 1. The blast freezing system may include a high-speed fan, blasting high speed, very low temperature cooled air against all or parts of the pod.

In yet another method, the system 100 may employ a dry ice system to freeze the contents of the pod 1. The dry ice may either be loaded into the machine or created in contact with the pod using a membrane and pressurized $CO_2$ gas.

According to an embodiment of the present invention, the step 208 provides freezing of the semi-solid foam followed by conditioning (warming to a target serving temperature) into ready to eat ice cream so that it is immediately ready to consume and the user doesn't need to wait for it to soften up.

At step 210, the pod 1 having ready to eat ice cream is ejected by the system 100 for consumption by the user.

The foregoing discussion of the present invention has been presented for purposes of illustration and description. It is not intended to limit the present invention to the form or forms disclosed herein. In the foregoing Detailed Description, for example, various features of the present invention are grouped together in one or more embodiments, configurations, or aspects for the purpose of streamlining the disclosure. The features of the embodiments, configurations, or aspects may be combined in alternate embodiments, configurations, or aspects other than those discussed above. This method of disclosure is not to be interpreted as reflecting an intention the present invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate embodiment of the present invention.

Moreover, though the description of the present invention has included description of one or more embodiments, configurations, or aspects and certain variations and modifications, other variations, combinations, and modifications are within the scope of the present invention, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and U.S. Provisional Application Ser. No. 62/100,126, filed Jan. 6, 2015 and Provisional Application Ser. No. 62/100,133 filed Jan. 6, 2015, are incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A system for making ice cream, the system comprising:
a pod having a mixture, wherein the pod includes a lid;
a whisking component attached to the lid of the pod and disposed within the pod, wherein the whisking component is configured to whisk the mixture and produce a whisked, aerated mixture within the pod;
an insulated chamber for receiving the pod and for freezing the whisked, aerated mixture within the pod to produce the ice-cream, wherein the insulated chamber includes a bottom contact freezing plate and a top contact freezing plate such that the pod is sandwiched between the bottom contact freezing plate and the top contact freezing plate,
the bottom contact freezing plate being in direct contact with the pod; and
a compressor operably connected to the bottom contact freezing plate and the top contact freezing plate to supply coolant liquid to the bottom contact freezing plate.

2. The system of claim 1, wherein the mixture includes a powder mixture, flavoring liquid, and a stabilized fluid.

3. The system of claim 2, wherein the stabilized fluid is selected from at least one of water, cream and milk.

4. The system of claim 1, wherein the whisking component is further configured to aerate and whip the mixture within the pod into foam.

5. The system of claim 1, further comprising a programmable motor for rotating a drive shaft to activate the whisking component.

6. The system of claim 1, with the limitations wherein coolant lines are disposed in the bottom contact freezing plate and in the top contact freezing plate to provide coolant flow through the bottom contact freezing plate and through the top contact freezing plate for contact freezing the whisked, aerated mixture.

7. The system of claim 1, wherein the compressor is operable to supply the coolant liquid to the insulated chamber when the whisking component is in operation.

* * * * *